(12) United States Patent
Bezencon et al.

(10) Patent No.: US 9,926,619 B2
(45) Date of Patent: Mar. 27, 2018

(54) ALUMINUM ALLOY

(71) Applicant: NOVELIS INC., Atlanta, GA (US)

(72) Inventors: Cyrille Bezencon, Chermignon (CH); Corrado Bassi, Salgesch (CH); Frank Schellinger, Varen (CH)

(73) Assignee: Novelis Inc., Atlanta, GA (US)

( * ) Notice: Subject to any disclaimer, the term of this patent is extended or adjusted under 35 U.S.C. 154(b) by 0 days.

(21) Appl. No.: 15/141,694

(22) Filed: Apr. 28, 2016

(65) Prior Publication Data

US 2016/0289802 A1    Oct. 6, 2016

Related U.S. Application Data

(62) Division of application No. 14/356,992, filed as application No. PCT/EP2012/072269 on Nov. 9, 2012.

(30) Foreign Application Priority Data

Nov. 11, 2011 (EP) .................................. 11188792
Aug. 31, 2012 (EP) .................................. 12182578

(51) Int. Cl.
*B32B 15/01* (2006.01)
*C22C 21/02* (2006.01)
(Continued)

(52) U.S. Cl.
CPC ............ *C22C 21/02* (2013.01); *B23K 1/0056* (2013.01); *B23K 1/19* (2013.01); *B23K 26/24* (2013.01);
(Continued)

(58) Field of Classification Search
None
See application file for complete search history.

(56) References Cited

U.S. PATENT DOCUMENTS 4,080,223 A    3/1978   Schoerner et al.
4,808,247 A    2/1989   Komatsubara et al.
(Continued)

FOREIGN PATENT DOCUMENTS

CN    101580909 A    11/2009
EP    1648694 A1    4/2006
(Continued)

OTHER PUBLICATIONS

Chinese Patent Application No. 201280066890.5, Office Action dated May 17, 2016, 12 pages.
(Continued)

*Primary Examiner* — Daniel J Schleis
(74) *Attorney, Agent, or Firm* — Kilpatrick Townsend & Stockton LLP

(57) ABSTRACT

In a first aspect, the invention provides aluminum alloy comprising the following composition, all values in weight %: Si 0.25-1.5 Cu 0.3-1.5 Fe up to 0.5 Mn up to 0.1 all other elements including Mg being incidental and present (if at all) then in an amount less than or equal to 0.05 individually, and less than or equal to 0.15 in aggregate, the balance being aluminum. In a second aspect, the invention provides a composite aluminum sheet product comprising a core layer and at least one clad layer wherein the at least one clad layer is an aluminum alloy comprising the following composition, all values in weight %: Si 0.25-1.5 Cu 0.3-1.5 Fe up to 0.5 Mn up to 0.1 all other elements including Mg being incidental and present (if at all) then in an amount less than or equal to 0.05 individually, and less than or equal to 0.15 in aggregate, the balance being aluminum. In a third aspect, the invention provides a method of making a joined structure of a steel component and an aluminum component made from the alloy and/or the sheet product of the invention.

13 Claims, 9 Drawing Sheets

(51) Int. Cl.

| | |
|---|---|
| B23K 35/28 | (2006.01) |
| B23K 35/00 | (2006.01) |
| B23K 35/02 | (2006.01) |
| C22C 21/04 | (2006.01) |
| C22C 21/14 | (2006.01) |
| C22F 1/043 | (2006.01) |
| B23K 1/005 | (2006.01) |
| C22C 21/16 | (2006.01) |
| B23K 26/323 | (2014.01) |
| B23K 1/19 | (2006.01) |
| B23K 26/24 | (2014.01) |
| C22C 21/08 | (2006.01) |
| C22F 1/047 | (2006.01) |
| C22F 1/057 | (2006.01) |
| C23C 2/06 | (2006.01) |
| C23C 2/40 | (2006.01) |
| B23K 26/242 | (2014.01) |
| B23K 103/20 | (2006.01) |
| B23K 101/00 | (2006.01) |
| B23K 101/18 | (2006.01) |

(52) U.S. Cl.
CPC .......... *B23K 26/242* (2015.10); *B23K 26/323* (2015.10); *B23K 35/002* (2013.01); *B23K 35/0238* (2013.01); *B23K 35/286* (2013.01); *B32B 15/012* (2013.01); *B32B 15/016* (2013.01); *C22C 21/04* (2013.01); *C22C 21/08* (2013.01); *C22C 21/14* (2013.01); *C22C 21/16* (2013.01); *C22F 1/043* (2013.01); *C22F 1/047* (2013.01); *C22F 1/057* (2013.01); *C23C 2/06* (2013.01); *C23C 2/40* (2013.01); *B23K 2201/006* (2013.01); *B23K 2201/18* (2013.01); *B23K 2203/20* (2013.01); *Y10T 428/12757* (2015.01); *Y10T 428/12764* (2015.01)

(56) References Cited

U.S. PATENT DOCUMENTS

| | | | |
|---|---|---|---|
| 4,814,022 | A | 3/1989 | Constant et al. |
| 5,541,007 | A | 7/1996 | Ueda et al. |
| 5,582,660 | A | 12/1996 | Erickson et al. |
| 6,413,331 | B1 | 7/2002 | Hurd et al. |
| 7,943,883 | B2 | 5/2011 | Doira et al. |
| 2007/0246509 | A1* | 10/2007 | Koshigoe ............ B32B 15/016 228/101 |
| 2009/0166067 | A1* | 7/2009 | Iwai ................ B32B 15/016 174/257 |
| 2010/0304175 | A1* | 12/2010 | Kilmer ............... B23K 35/0233 428/576 |

FOREIGN PATENT DOCUMENTS

| | | |
|---|---|---|
| EP | 1666190 A1 | 6/2006 |
| EP | 1648694 B1 | 4/2008 |
| EP | 2085214 A1 | 8/2009 |
| EP | 2156945 A1 | 2/2010 |
| EP | 2248924 A1 | 11/2010 |
| JP | H0211735 A | 1/1990 |
| JP | H04178290 A | 6/1992 |
| JP | H05287424 A | 11/1993 |
| JP | H0718390 A | 1/1995 |
| JP | H09296262 A | 11/1997 |
| JP | 2002294377 A | 10/2002 |
| JP | 2003211270 A | 7/2003 |
| JP | 2004223548 A | 8/2004 |
| JP | 2007136525 A | 6/2007 |
| JP | 2007260701 A | 10/2007 |
| JP | 2007301634 A | 11/2007 |
| JP | 2008068290 A | 3/2008 |
| JP | 4768487 B2 | 9/2011 |
| RU | 2327756 C2 | 6/2008 |
| WO | 9814626 A1 | 4/1998 |

OTHER PUBLICATIONS

Russian Patent Application No. RU 2014122491, Notice of Decision to Grant dated May 4, 2016, 8 pages.
Japanese Patent Application No. 2014-540477, Decision to Grant a Patent dated Feb. 16, 2016, 6 pages.
Althoff, J., et al., "Properties of Aluminium Deep-Drawing Plates", Aluminium, 1976, pp. 632-635, vol. 52, No. 10.
Barlat, F. "Forming limit diagrams—predictions based on some microstructural aspects of materials", Forming Limit Diagrams: Concepts, Methods, and Applications, 1989, pp. 275-301, The Mineral, Metals & Materials Society.
Brillant, M, et al., "Problems, Solutions and Performances of Aluminum Spot Welding", Ingenieurs de l'Automobile, 1977, pp. 651-659, vol. 10.
Canadian Patent Application No. 2,854,838, Office Action dated Sep. 17, 2015, 4 pages.
Canadian Patent Application No. 2,854,838, Office Action dated Jan. 8, 2016, 3 pages.
Chinese Patent Application No. 201280066890.5, Office Action dated Sep. 25, 2015, 17 pages.
European Patent Application No. 11188792.3, Extended European Search Report dated Apr. 5, 2012, 6 pages.
European Patent Application No. 14182465.6, Extended European Search Report dated Jan. 19, 2015, 5 pages.
European Patent No. 2592165, Notice of Opposition and Opposition Writ filed Jun. 3, 2015, 35 pages.
Güngör, Ozlem Esma, et al., "Effect of filler wire composition and metallic coating on the joint performance of aluminium/steel braze-welds", Welding and Cutting, 2008, pp. 303-312, vol. 7, No. 5.
International Patent Application No. PCT/EP2012/072269, International Search Report and Written Opinion dated Jan. 30, 2013, 12 pages.
Japanese Patent Application No. 2014-540477, Office Action dated Apr. 14, 2015, 11 pages.
Japanese Patent Application No. 2014-540477, Office Action dated Oct. 6, 2015, 9 pages.
Korean Patent Application No. 10-2014-7015867, Office Action dated May 27, 2015, 12 pages.
Lege, Daniel J., et al., "Characterization and modeling of the mechanical behavior and formability of a 2008-T4 sheet sample", International Journal of Mechanical Sciences. 1989, pp. 549-563, vol. 31, No. 7, Pergamon Press plc, Great Britain.
Mexican Patent Application No. MX/A/2014/005504, Office Action dated Nov. 9, 2015, 6 pages.
Potesser, M., et al., "The Characterisation of the Intermetallic Fe—Al Layer of Steel-Aluminium Weldings", EPD Congress 2006, 2006, pp. 167-176, The Minerals, Metals & Materials Society.
Raveglia, M., "Prospects of aluminum sheet in automobiles", Proc. Int. Conf. Aluminium + Automobil, 1976, 11 pages, Aluminium-Zentrale, Dusseldorf, Germany.
Rouanet, J. C., "Technological abilities of the new 2002 alloy for automotive bodywork", Rev. Alum., 1976, pp. 98-102, vol. 448.
The Aluminum Association, "International Alloy Designations and Chemical Composition Limits for Wrought Aluminum and Wrought Aluminum Alloys", Feb. 2009, 37 pages, The Aluminum Association.
Zhang, H. T., et al., "Interfacial phenomena of cold metal transfer (CMT) welding of zinc coated steel and wrought aluminium", Materials Science and Technology, 2008, pp. 1346-1349, vol. 24, No. 11, Maney Publishing.
U.S. Appl. No. 14/356,992, Non-Final Office Action dated Feb. 12, 2015, 10 pages.
U.S. Appl. No. 14/356,992, Final Office Action dated Jul. 22, 2015, 10 pages.
U.S. Appl. No. 14/356,992, Advisory Action dated Sep. 18, 2015, 6 pages.

(56) References Cited

OTHER PUBLICATIONS

U.S. Appl. No. 14/356,992, Non-Final Office Action dated Feb. 12, 2016, 7 pages.
Canadian Patent Application No. 2,854,838, Office Action dated Apr. 26, 2016, 3 pages.
Mexican Patent Application No. MX/a/2014/005504, Office Action dated May 20, 2016, 7 pages.
Mexican Patent Application No. MX/a/2014/005504, Office Action dated Nov. 11, 2016, 5 pages.
Mexican Patent Application No. MX/a/2014/005504, Office Action dated Jun. 6, 2017, 4 pages.

* cited by examiner

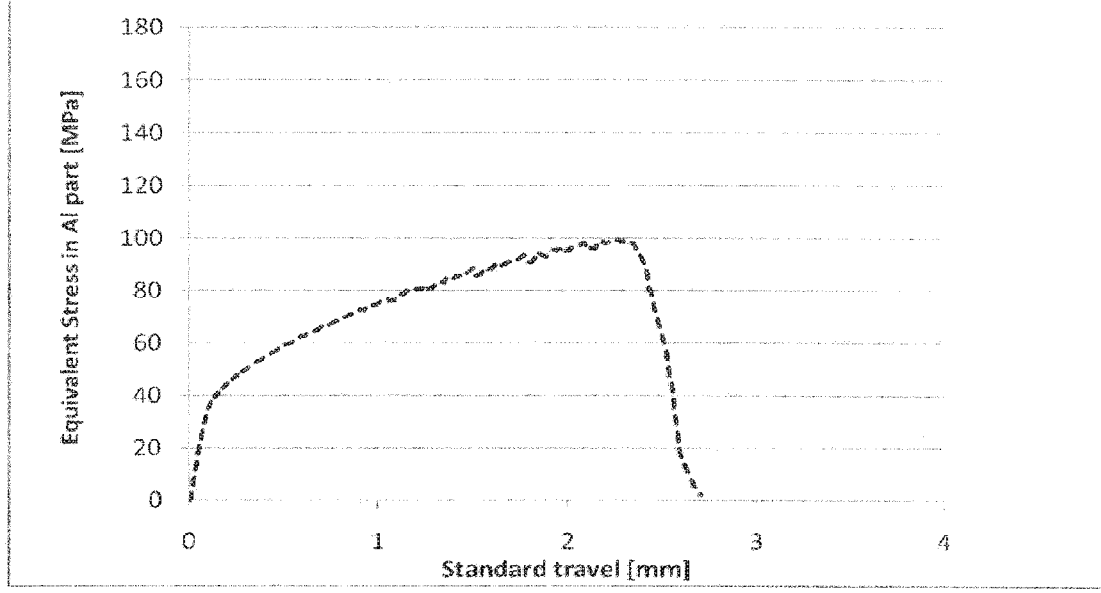
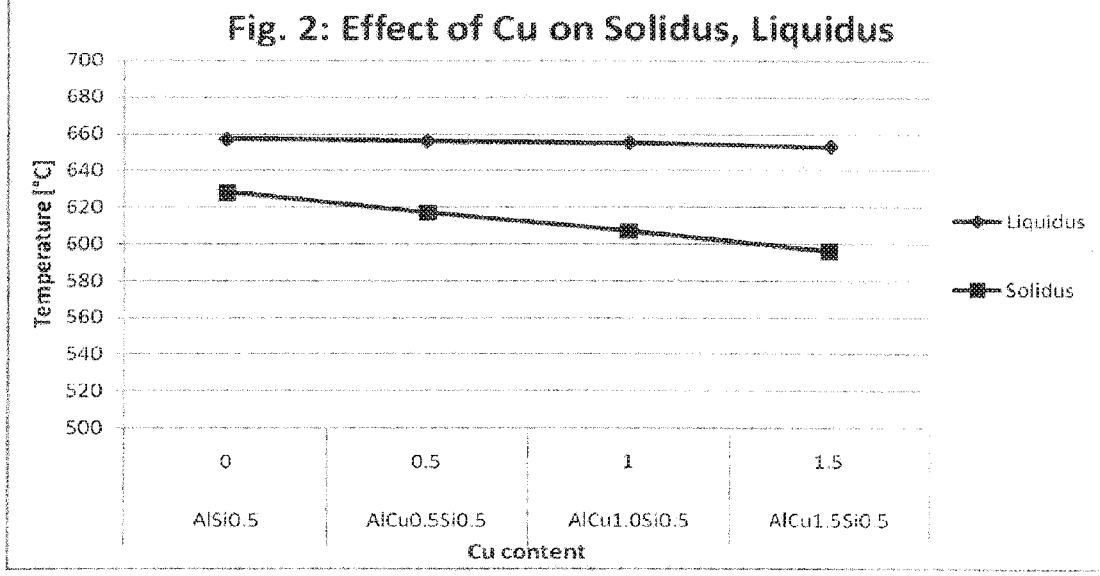

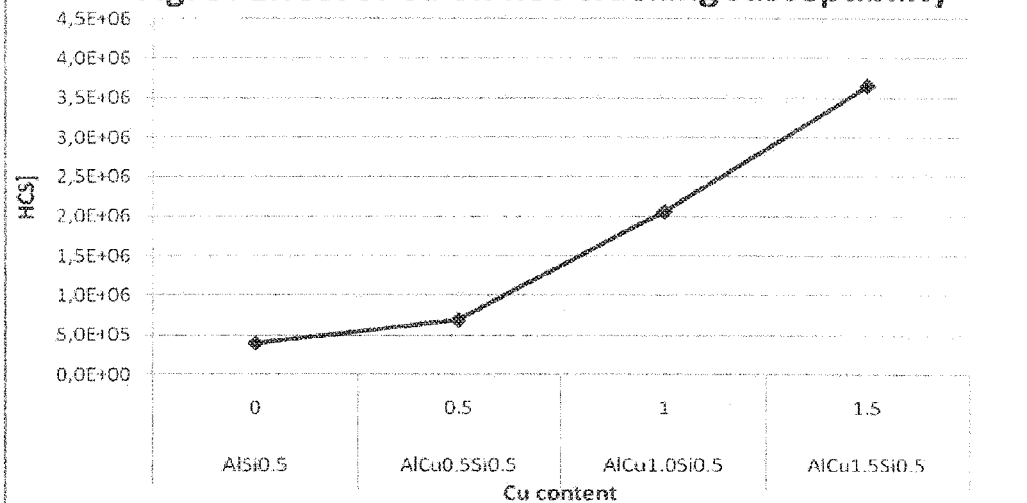
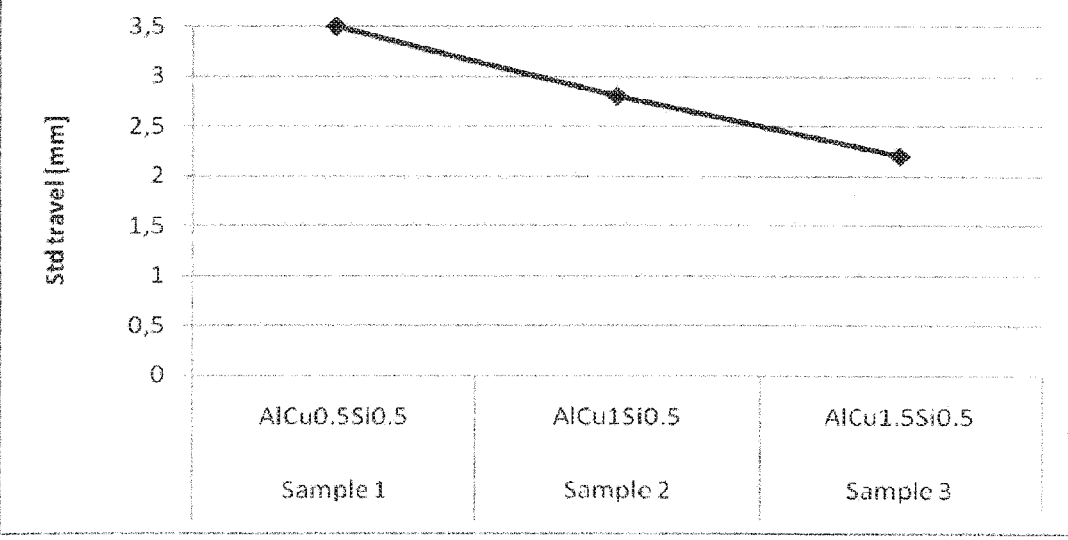

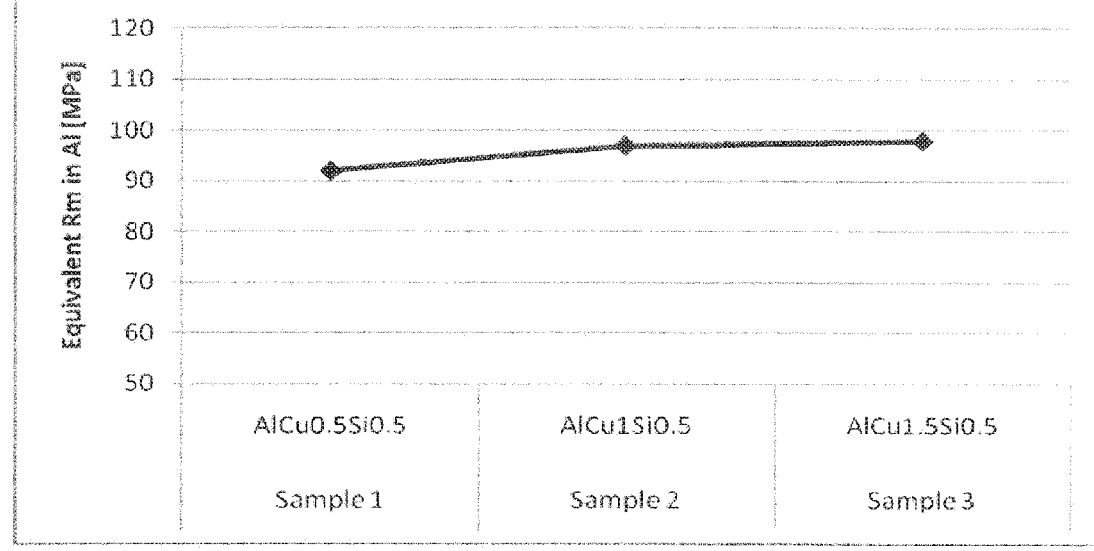
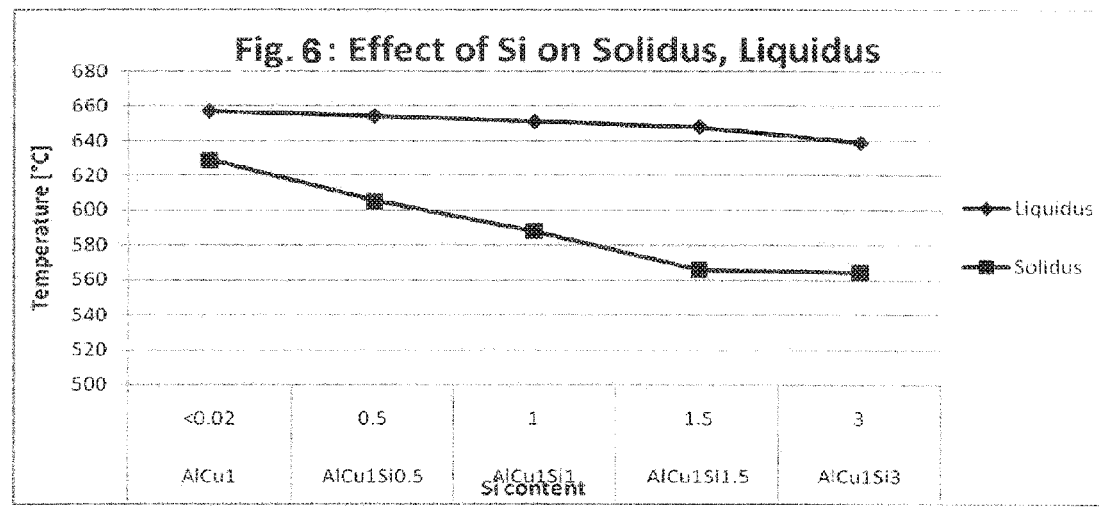

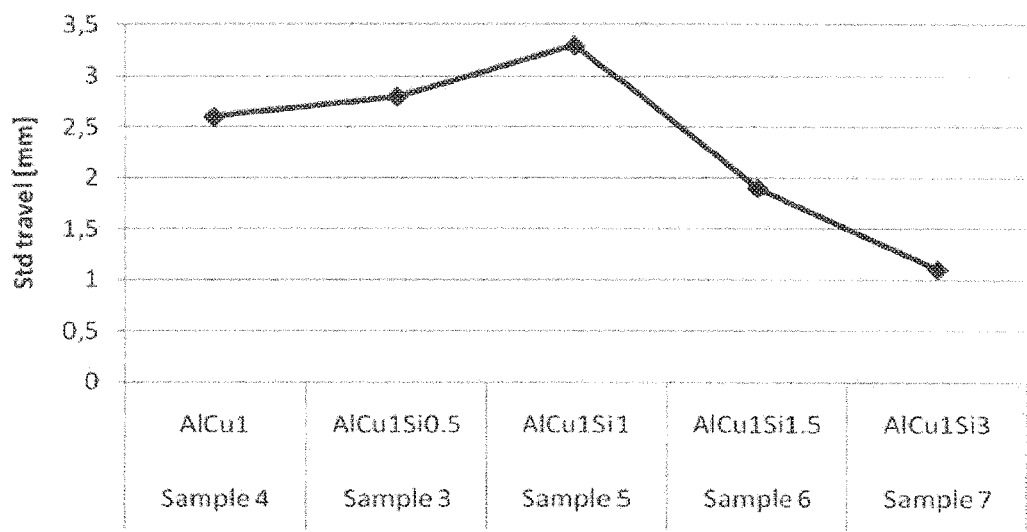
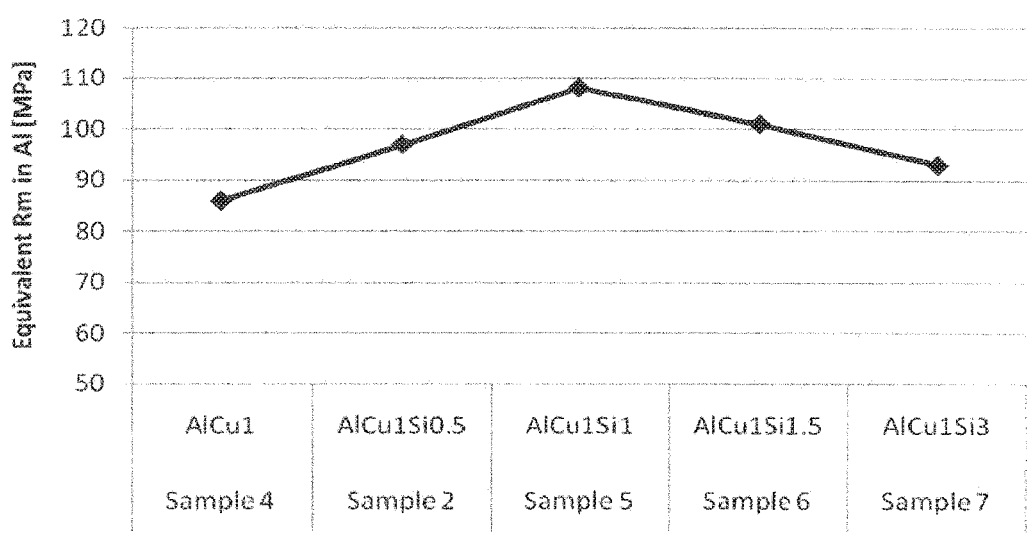

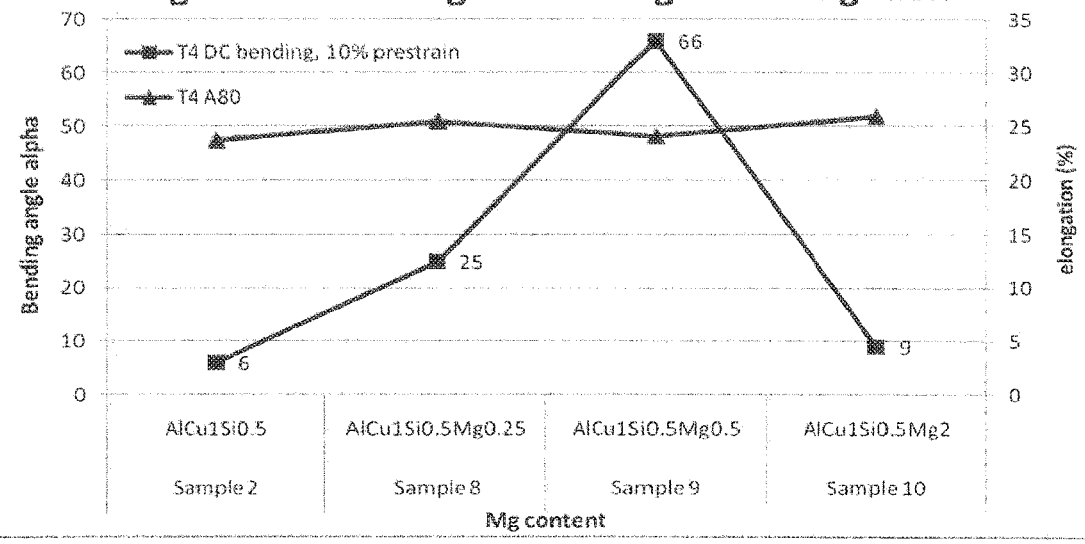
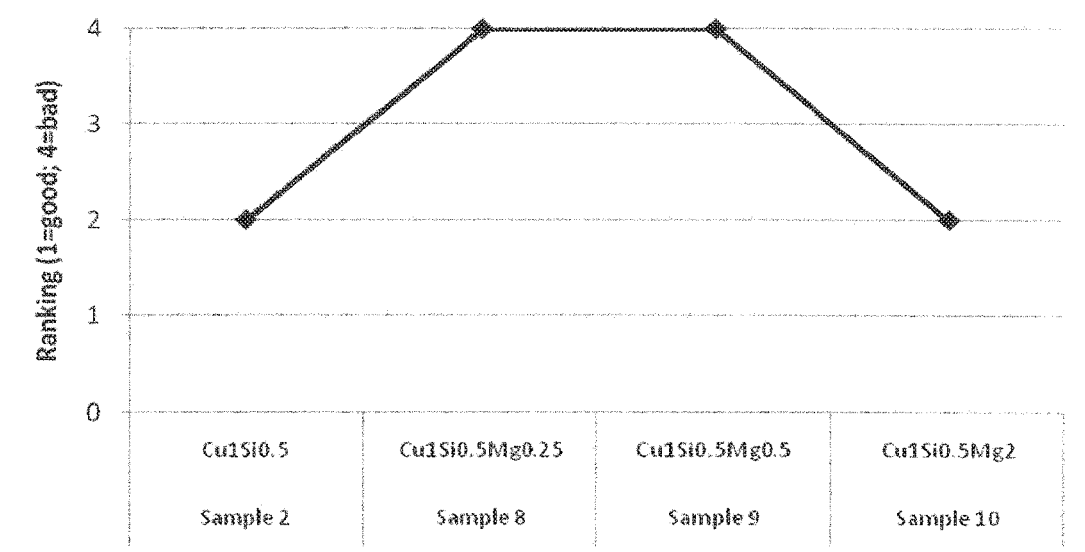

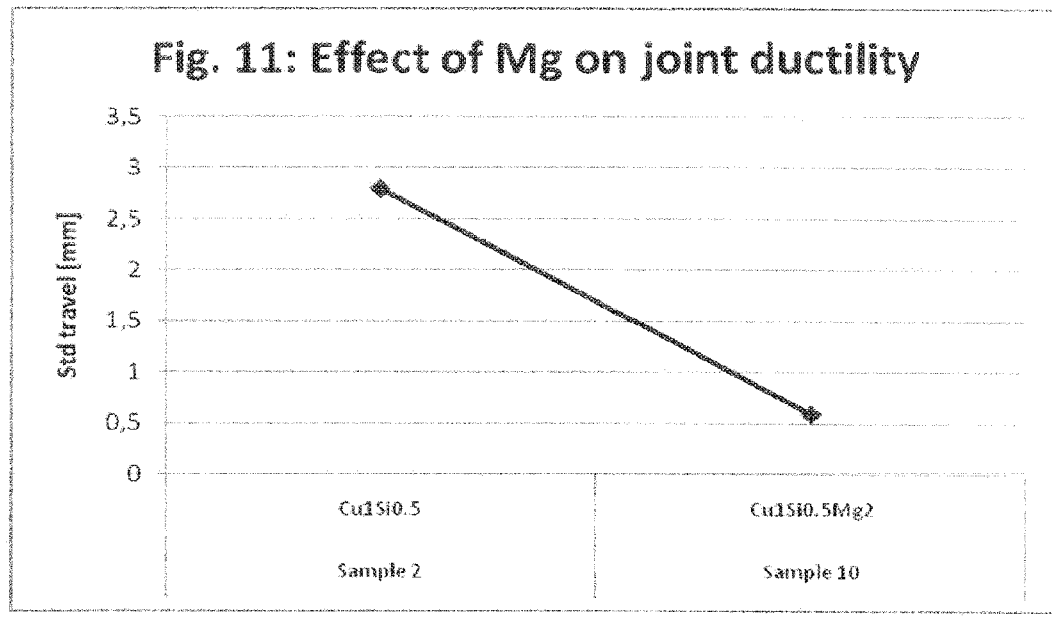

FIG. 12A – micrograph image of interface with AlSi10 alloy
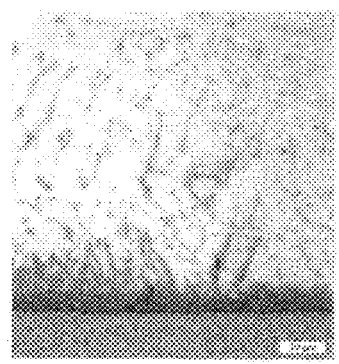
FIG. 12B – micrograph image of interface with AlSi10 alloy with phase analysis
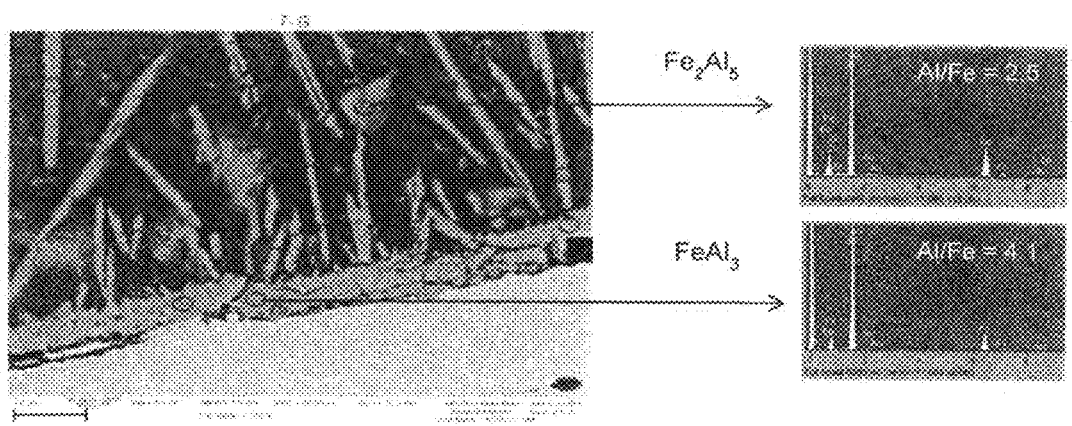

FIG. 13A – micrograph image of interface according to the invention
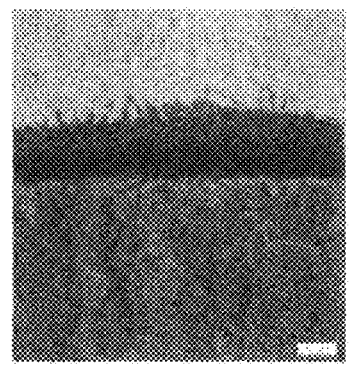
FIG. 13B – micrograph image of interface according to the invention with phase analysis
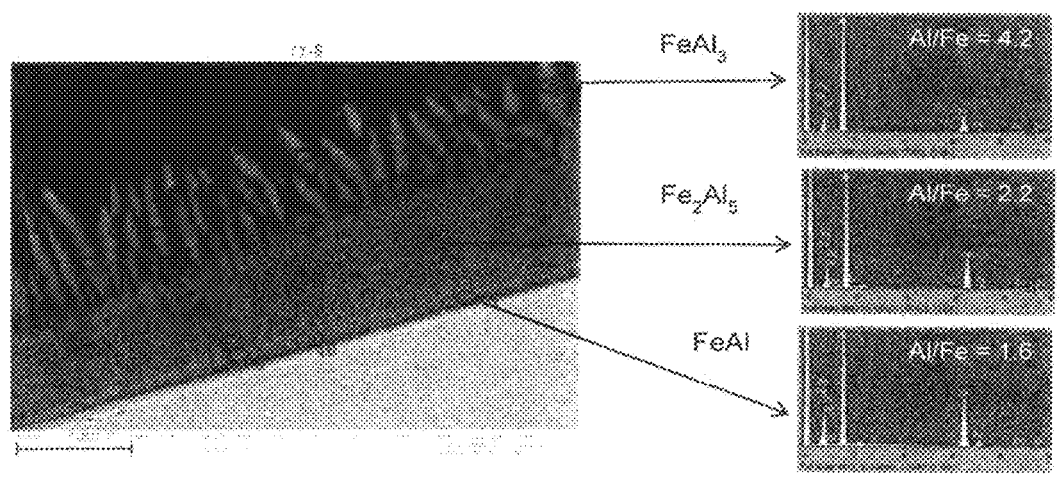

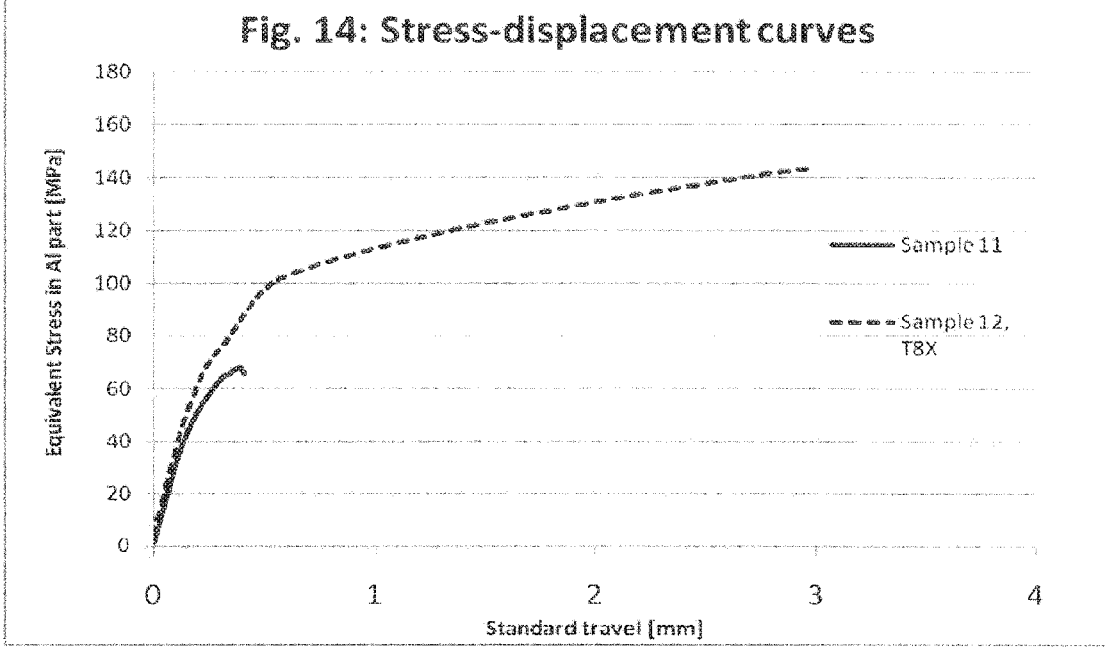

ALUMINUM ALLOY

CROSS-REFERENCE TO RELATED APPLICATIONS

This application is a division of U.S. patent application Ser. No. 14/356,992 filed on May 8, 2014, which is the U.S. national phase of International Application No. PCT/EP2012/072269 filed on Nov. 9, 2012, which application claims the benefit of European Patent Application No. 11188792.3 filed on Nov. 11, 2011, and European Patent Application No. 12182578.0 filed on Aug. 31, 2012, the entire contents of all of which are specifically incorporated herein by this reference.

This invention concerns an aluminum alloy and sheet alloy product primarily intended for use in transportation vehicles. The aluminum alloy is based on the Al—Si—Cu system and is particularly suited for use as a sheet product useful in the manufacture of automobiles. The aluminum alloy is also suitable for use as a clad layer on a composite sheet. The invention also concerns a joined structure comprising a steel component and an aluminum component.

The use of aluminum alloys in the production of automobiles and other transportation vehicles has been established for many years. A range of different alloys are used depending on the particular requirements of specific components. In certain applications it is desirable that the material be of high strength. Yet other applications require higher formability and, in such cases, strength may be considered less important. There has also been a desire for materials that deform easily under impact, for example in the event of collision with pedestrians and such materials may have even lower strengths. Aluminum alloy products for such applications are provided in various forms, from sheet to forgings, extrusions to castings.

Typically the aluminum alloys are from the 6XXX series of alloys, whose principal alloying elements are Mg and Si, or from the 5XXX series of alloys, where the principal alloying element is Mg. There has been occasional use of the 2XXX series alloys where the principal alloying element is Cu. For an understanding of the number designation system most commonly used in naming and identifying aluminum and its alloys see "International Alloy Designations and Chemical Composition Limits for Wrought Aluminum and Wrought Aluminum Alloys," published by The Aluminum Association, revised February 2009.

Clad sheets or composite sheets are also known for use in automotive and other applications. In such products the composite sheet consists of at least two layers of alloys with different chemical compositions. One layer, typically called the core, provides bulk mechanical properties, whilst the second layer, typically called the clad layer, provides specific surface characteristics. The clad layer is usually thinner than the core layer. Commonly the core layer of one composition is interposed between two clad layers of another composition to form a three-layer sheet, both clad layers having the same composition. But this is not always the case and a composite sheet may be provided of multiple layers, each layer having a different composition.

Aluminum alloys are not the only materials used in construction of transportation vehicles; steel remains an important structural material. Whilst concerned primarily with automotive structures, the invention described herein is equally applicable to other transportation vehicles including but not limited to aircraft and land vehicles such as trains, buses and trucks as well as other industrial applications where there is a need to join aluminum components to steel components. The case of automotive structures is used to illustrate the background to the invention and to demonstrate its benefits.

At various locations within the automobile structure, the aluminum alloy must come into contact and be joined to a steel alloy product. This creates problems because aluminum and steel cannot be satisfactorily joined by conventional welding techniques, such as TIG, MIG, laser welding, plasma welding, etc., due to a large difference between liquidus temperatures and low inter-element solubility. Indeed, classically defined welding, in the sense of coalescence of two molten metals, does not occur because the temperatures used are generally not high enough to cause the steel to melt. Various terms are used, therefore, to describe the thermal joining process that takes place and such terms may include but are not limited to laser welding, braze welding and so on. In essence, and for the purposes of this invention, a structure that comprises an aluminum part joined to a steel part means one that arises from a thermal process that causes at least a part of the aluminum component to melt.

The binary Al—Fe equilibrium phase diagram indicates that various equilibrium intermetallic compounds such as $Fe_2Al_5$, $FeAl_3$, $FeAl_2$ and $FeAl$ exist. These intermetallic compounds are known to be hard and brittle. In addition, the high heat input of conventional welding techniques and the resulting reaction and diffusion between the steel and aluminum parts can give rise to a thick layer of brittle intermetallics. The presence of such intermetallics at steel/aluminum interfaces may lead to poor mechanical properties and brittle fracture behavior of the joint. The joint between the aluminum and steel alloys can thus become a site of key structural weakness. A joint that has reasonable fracture strength, one that possesses sufficient ductility, is preferable.

Attempts have been made to improve the interfacial strength and ductility of such joints. One approach has been to reduce the heat input to the joining process by, for example, increasing the welding speed, adding a backing block to extract heat or interrupting the welding process. Such an approach is embodied within the known technique of Cold Metal Transfer braze-welding, (CMT). Disadvantages of this approach are that, with it, manufacturing is more complicated and more expensive, there is a reduced operating window that does not lend itself to mass production on an industrial scale and, although there is an improvement in interface strength, the fracture mode remains brittle.

A second approach to improve weldability has been to add Zn to the weld to promote formation of an Al—Zn, low melting point, eutectic structure. In this approach a Zn filler material is used without flux during the welding operation in an air atmosphere or a Zn cladding is used on the steel component. A low heat input may also be used in combination. A problem with the use of Zn is that it tends to evaporate during laser welding. Further, Zn reduces the corrosion resistance of the joint region because it has a highly negative corrosion potential.

Japanese Pat. No. JP04768487B2 describes a method for obtaining a composite structure of aluminum and steel for motor vehicles which involves melting an aluminum layer of AA5182 alloy on a steel plate using a laser beam without flux.

U.S. Pat. No. 4,814,022 describes a weldable aluminum alloy comprising Si and Mg defined by a trapezium having co-ordinates at; Si 0.5, Mg 0.1; Si 0.5 Mg 0.2; Si 1.3, Mg 0.5; Si 1.3, Mg 0.1. The alloy further contains Cu between 0.1 and 0.5. The composition is controlled to limit precipitation of $Mg_2Si$ during solidification after casting and the Mg$_2$Si precipitates developed in the alloy, and necessary for strengthening, arise from subsequent heat treatments. Although described as a weldable alloy, the examples describe the alloy being welded to itself, not to a steel component.

U.S. Pat. No. 4,808,247 describes a process of making Al—Si—Cu—Mg alloys that involves the application of a final annealing step wherein the alloys described are heated to between 60-360° C., held at that temperature for a period, and cooled in a controlled manner. Three alloys are described, all of which contain Mg to promote the formation of Mg$_2$Si strengthening precipitates.

U.S. Pat. No. 5,582,660 describes an alloy for use in automotive sheet comprising the following composition; Si>1.0 to about 1.3, Mg>0.25 to about 0.60, Cu about 0.5 to about 1.8, Mn about 0.01 to about 0.1, Fe about 0.01 to about 0.2, balance being substantially aluminum and incidental elements and impurities. The presence of Mg in combination with Si is essential for the formation of Mg$_2$Si strengthening precipitates.

WO 98/14626 describes an aluminum alloy for rolled products with the following composition in wt % of: Si 0.8-1.5; Mg 0.2-0.7; Fe 0.2-0.7; Mn 0.01-0.1; Cu up to 0.25; Cr up to 0.1; Zn up to 0.4; V up to 0.2 m balance being Al. Silicon and Magnesium are added for the formation of strengthening Mg$_2$Si precipitates. Fe is employed to form a sufficient volume fraction of Al—Fe phases that can act as recrystallization nucleation sites after being broken up and dispersed during rolling.

Investigators have also considered the use of Al—Si solder alloys, as evidenced by the article "The Characterisation of the Intermetallic Fe—Al Layer of Steel-Aluminum Weldings" by Potesser et al, published in the EPD Congress, 2006.

U.S. Pat. No. 7,943,883 describes a method for joining an iron member and an aluminum member, where the iron member includes a plated layer at least on the joining side and the aluminum layer is formed by an aluminum core and an aluminum cladding with a melting point lower than that of the aluminum core material, provided on the joining side of the with the iron member. The alloy of the aluminum cladding layer is either an Al—Si alloy with 4.0-11.6 wt % Si, balance Al or an Al—Cu alloy with 5.7-33.2 wt % Cu, balance Al.

Further recommendations have been to reduce the thickness of the interface zone created when joining aluminum to steel but this requires very tight process window control during welding and is extremely difficult to achieve on a production scale.

These proposals still leave something to be desired, in the quality of a joint between an aluminum alloy product and a steel alloy product.

It is an object of the invention to provide an aluminum alloy which can be welded to a steel alloy without the use of a filler alloy and which provides an interface possessing a reasonable strength and a ductile fracture mechanism, a useful way to enrich the range of available compromises between strength and ductility.

In accordance with a first aspect of the invention an aluminum alloy is provided comprising the following composition, all values in weight %:

| | |
|---|---|
| Si | 0.25-1.5 |
| Cu | 0.3-1.5 |
| Fe | up to 0.5 |
| Mn | up to 0.1 | all other elements including Mg being incidental and present (if at all) then in an amount less than or equal to 0.05 individually, and less than or equal to 0.15 in aggregate, the balance being aluminum.

In embodiments, the amount of Mn is incidental, that is, not more than 0.05 wt %. In practice an amount of 0.08 wt % for Mn is contemplated, but this for expedience, and commercial practicality, rather than to enhance performance in meeting technical targets.

In contrast to the prior art solutions to the technical problem, the inventors have adapted the aluminum alloy composition to improve the wettability of the aluminum alloy, to reduce the susceptibility of the alloy to hot cracking shortness, to modify the diffusion of Fe from the steel into the aluminum alloy product and to bias the type of intermetallic formed close to the steel to favour the FeAl type over the FeAl$_3$-type. With alloys according to the invention, the interface is characterized by a dense intermetallic layer comprising two intermetallic types, FeAl and Fe$_2$Al$_5$, with FeAl in the zone adjacent the steel alloy. In addition, the interface region created with the alloy of the invention is relatively large, comprising 3 distinct zones. This thicker interface zone permits the use of wider processing parameters, giving greater process flexibility and thereby rendering the new alloy suitable for large scale industrial production.

Si is added to the alloy to reduce the solidus temperature and to improve the wettability. For these reasons the lower limit of Si is set at 0.25. Further, additions of Si help reduce the susceptibility of hot cracks forming after welding and a preferred lower limit for Si is 0.5. The upper limit of Si is set to 1.5 because a higher Si level favours the formation of Al(Fe3,Si)-type intermetallics and has a negative effect on ductility and the preferred upper limit of Si is 1.25.

Cu is also added to the alloy to reduce the solidus temperature and to improve the wettability but it is also added to modify the Al—Fe intermetallic type. For these reasons the lower limit of the Cu content is set at 0.3. The amount of Cu should not be too high, however, because a higher Cu content increases the risk of hot cracking. Further, higher Cu contents also reduce the joint ductility. For these reasons the upper limit of Cu is set at 1.5 although in some situations setting an upper limit for Cu of 1.25 may be desirable.

Whilst Mg in combination with Si would lead to the formation of strengthening Mg$_2$Si precipitates, that is not helpful here because Mg does not contribute to the improvement of the joint quality. As the Mg content is increased there are declines in the ductility of the joint, in the formability of the alloy and in the quality of the weld, porosity and cracking. A small amount of Mg may be tolerated, (to accommodate scrap recycling), but the Mg content should not exceed that of an individual impurity element.

Mn also makes no significant impact on the hot cracking susceptibility or formability but it may be present in recycled metal from other sources. Here it can be tolerated in amounts higher than would be the case for other elements without serious adverse effect. Thus, for commercial reasons (more recycling) an amount higher than that permitted for other incidental impurity elements is permitted in the case of Mn.

Other elements such as, but not limited to, Zn, Ni, Ti, B, Cr and V may be present in the form of trace elements or unavoidable impurities or, in the case of Ti and B, through the addition of grain refiners. Each such trace element or unavoidable impurity or grain refining element is present in an amount less than 0.05 each and less than 0.15 in total. The balance of the alloy is aluminum.

In accordance with a second aspect of the invention a composite aluminum sheet is provided, said composite aluminum alloy sheet comprising a core and at least one clad layer wherein the clad layer comprises the following composition, all values in weight %:

| | |
|---|---|
| Si | 0.25-1.5 |
| Cu | 0.3-1.5 |
| Fe | up to 0.5 |
| Mn | up to 0.1 | all other elements including Mg being incidental and present (if at all) then in an amount less than or equal to 0.05 each or less than or equal to 0.15 in aggregate the balance being aluminum.

In embodiments, the amount of Mn is incidental, that is, not more than 0.05 wt %. In practice an amount of 0.08 wt % for Mn is contemplated, but this for expedience, and commercial practicality, rather than to enhance performance in meeting technical targets.

In the context of composite sheets, the term "core" layer is used to indicate the alloy contributing most to the bulk properties of the composite sheet and the term "clad" is used to indicate the alloy at the surface providing surface properties for the composite sheet. Composite sheets may comprise a single clad layer on a single core layer although more often they comprise two clad layers on either side of the single core layer. Typically the clad layers are thinner than the core layer, on their own and as a combined total.

Where the alloy is used as a clad layer on a composite sheet, the core layer may be a 6XXX series alloy or a 5XXX series alloy as understood by reference to the Aluminum Association Teal Sheets. If the core layer is a 6XXX series alloy it may be selected from the group consisting of AA6016, AA6016A, AA6014, AA6011, AA6111, AA6009, AA6010, AA6022 and AA6451. If the core alloy is a 5XXX series alloy it may be selected from the group consisting of AA5005, AA5152, AA5052, AA5018, AA5454, AA5754, AA5056, AA5456, AA5182, AA5186, AA5059, AA5083 and AA5383. An advantage of using the new alloy in a composite sheet, wherein the core is a high strength alloy, is that the entire sheet is far less susceptible to distortion during further processing of the vehicle body such as, for example, during the thermal treatment of paint baking.

In accordance with a third aspect of the invention a joined structure is provided wherein the joined structure comprises a steel component and an aluminum alloy component joined thereto and wherein the aluminum alloy component is made from an aluminum alloy comprising the following composition, all values in weight %:

| | |
|---|---|
| Si | 0.25-1.5 |
| Cu | 0.3-1.5 |
| Fe | up to 0.5 |
| Mn | up to 0.1 | all other elements including Mg being incidental and present (if at all) then in an amount less than or equal to 0.05 each or less than or equal to 0.15 in aggregate, the balance being aluminum.

In embodiments, the amount of Mn is incidental, that is, not more than 0.05 wt %. In practice an amount of 0.08 wt % for Mn is contemplated, but this for expedience, and commercial practicality, rather than to enhance performance in meeting technical targets.

In accordance with a fourth aspect of the invention a joined structure is provided wherein the joined structure comprises a steel component and an aluminum alloy component joined thereto and wherein the aluminum alloy component is made from a composite aluminum alloy sheet comprising a core and at least one clad layer wherein the clad layer comprises the following composition, all values in weight %:

| | |
|---|---|
| Si | 0.25-1.5 |
| Cu | 0.3-1.5 |
| Fe | up to 0.5 |
| Mn | up to 0.1 | all other elements including Mg being incidental and present (if at all) then in an amount less than or equal to 0.05 each or less than or equal to 0.15 in aggregate, the balance being aluminum.

In embodiments, the amount of Mn is incidental, that is, not more than 0.05 wt %. In practice an amount of 0.08 wt % for Mn is contemplated, but this for expedience, and commercial practicality, rather than to enhance performance in meeting technical targets.

For the purpose of this invention the word "joined" is intended to mean a joint resulting from a thermal process operating at a temperature that causes melting of at least a part of the inventive alloy component. The thermal process used does not lead to melting of the steel component. Therefore "welding," in the classic sense of coalescence of two or more molten metals, does not occur. Since the use of a flux is not necessary, (although it could be used), the process is not classical brazing although one can describe the process as fluxless brazing. Others have used the term "braze-welding." Under the application of sufficient heat, most conveniently from a laser but conceivably from other sources, the alloy of the aluminum component melts and reacts with the surface layers of the steel component, including the zinc coating, if such a coating is present. The temperature is sufficiently high that diffusion of Fe from the steel component into the molten aluminum occurs and, when the molten aluminum cools and freezes, a series of layers rich in intermetallic compounds is formed with the Al/Fe ratio increasing as the distance from the steel component increases. A Zn coating on the steel component improves the wettability of the aluminum alloy of the invention and it is preferred that the steel component be provided with such a Zn layer.

According to a fifth aspect of the invention there is provided a method of making a joined structure wherein the joined structure comprises a steel component and an aluminum alloy component and wherein the steel and aluminum alloy components are joined by a thermal process that causes at least a part of the aluminum component to melt and wherein the aluminum alloy component is made from an alloy that has the following composition:

| | |
|---|---|
| Si | 0.25-1.5 |
| Cu | 0.3-1.5 |
| Fe | up to 0.5 |
| Mn | up to 0.1 | all other elements including Mg being incidental and present (if at all) then in an amount less than or equal to 0.05 each or less than or equal to 0.15 in aggregate the balance being aluminum.

In embodiments, the amount of Mn is incidental, that is, not more than 0.05 wt %. In practice an amount of 0.08 wt % for Mn is contemplated, but this for expedience, and commercial practicality, rather than to enhance performance in meeting technical targets.

In comparison to the prior art, the thermal joining of a steel component with said aluminum alloy, yields improved hot crack-resistance, ductility and strength of the joint.

At the interface region between the steel sheet and the aluminum sheet, the bias towards particles of FeAl over other species of Fe/Al intermetallics helps to render the interface less brittle and more ductile without any unacceptable loss of strength.

The aluminum alloy according to the invention is intended for primary use in sheet form but the scope of the invention is not limited to that form. The skilled person will understand that the alloy of the invention can be provided in other product forms, such as extrusions, and can still be welded to steel components. Although the primary focus is on automotive structures, the skilled reader will realize that the alloy of the invention, and its use in joined structures incorporating steel, can be applicable to many different applications in the transportation sector, (marine, rail, aerospace), as well as many other industrial applications, (construction, plant machinery, etc.).

In the following, the invention will be described in more detail by referring to examples and Figures which show the results of tests conducted on embodiments of the claimed invention. Neither the detailed description nor the Figures are intended to limit the scope of protection which is defined by the appended claims.

FIG. 1 is a plot of a stress-displacement curve for an alloy according to the invention.

FIG. 2 is a plot of the effect of Cu on the equilibrium solidus and liquidus temperature.

FIG. 3 is a plot of the effect of Cu on calculated hot-cracking susceptibility.

FIG. 4 is a plot of the effect of Cu on joint ductility.

FIG. 5 is a plot of the effect of Cu on joint strength.

FIG. 6 is a plot of the effect of Si on the equilibrium solidus and liquidus temperature.

FIG. 7 is a plot of the effect of Si on joint ductility.

FIG. 8 is a plot of the effect of Si on joint strength.

FIG. 9 is a plot of the effect of Mg on bending and elongation.

FIG. 10 is a plot of the effect of Mg on weld quality.

FIG. 11 is a plot of the effect of Mg on joint ductility.

FIG. 12A and FIG. 12B show two images of the interface produced when an AlSi10 alloy is welded to steel sheet including phase analysis.

FIG. 13A and FIG. 13B show two images of the interface produced when an alloy according to the invention is welded to steel sheet including phase analysis.

FIG. 14 is a plot of the stress-displacement curves for two composite sheets after joining to steel, one according to the invention and another according to the prior art.

EXAMPLE 1

Table 1 lists the compositions of alloys cast in the form of small ingots, each ingot measuring 20×150×200 mm.

TABLE 1

| Sample | Si | Fe | Cu | Mn | Mg |
|---|---|---|---|---|---|
| 1 | 0.50 | 0.30 | 0.46 | <0.01 | <0.01 |
| 2 | 0.51 | 0.19 | 1.02 | <0.01 | <0.01 |
| 3 | 0.51 | 0.31 | 1.48 | <0.01 | <0.01 |
| 4 | 0.005 | 0.20 | 0.99 | <0.01 | <0.01 |
| 5 | 0.98 | 0.20 | 1.02 | <0.01 | <0.01 |
| 6 | 1.48 | 0.20 | 0.98 | <0.01 | <0.01 |
| 7 | 2.97 | 0.20 | 1.00 | <0.01 | <0.01 |
| 8 | 0.51 | 0.20 | 0.98 | <0.01 | 0.26 |
| 9 | 0.51 | 0.20 | 0.99 | <0.01 | 0.50 |
| 10 | 0.51 | 0.21 | 1.02 | <0.01 | 2.00 |

All alloys contained less than 0.05 of other elements individually and less than 0.15 in total, the balance being aluminum. Samples 8, 9 and 10 are comparative, and not within the scope of the claims below.

The ingots were homogenized in an air furnace at 550° C. for 6 hours, hot-rolled to 10 mm and cold rolled to 1 mm. The sheet samples were annealed at 430° C. for 1 hour to cause recrystallization. A final leveling operation was applied to the 1 mm sheet.

Sheet samples were then joined by a fluxless laser welding process to a 1 mm sheet of low-alloyed steel coated with a 7 μm zinc layer (hot dip galvanized) using an Nd-YAG laser with a constant power of 3 kW. The joining geometry was flange welding (Kehlnaht) with a laser angle of 60° and no gap between the two sheets. The laser speed was 4 m/min for all alloy combinations.

The compositional effect of the different elements on the equilibrium solidus and liquidus temperatures was calculated using commercial thermodynamic software from JMatPro coupled to in-house database. The hot cracking susceptibility was also calculated on the basis of thermodynamics calculation of the solid fraction evolution through the solidification interval. In both cases, nominal alloy compositions were used.

All samples of joined sheets were subjected to dye penetrant inspection (DPI) to assess the visual integrity of the joints. The quality of the joint under DPI was based on a simple ranking system from 1 to 4, with 1 being good, 4 being bad (containing a large number of hot-cracks or/and coarse porosity).

The nature and distribution of intermetallics produced in the interface zone was evaluated by conventional SEM and EDX analysis.

The joined samples were also subjected to lap shear tensile testing to assess joint fracture strength and ductility. It is not appropriate to use conventional stress-strain curves in such figures because the test configuration means that the tensile stress, and thus plastic deformation, is not constant throughout the specimen. The results of tensile tests on lap shear joints are presented as equivalent stress in the aluminum section against grip-to-grip distance during the test, (described herein as standard travel). The equivalent stress within the aluminum part of the joined sample is the nominal force divided by the cross-sectional area of the aluminum section. The standard travel is an indication of the ductility of the joint.

Some samples were subjected to 3-point bending tests to evaluate formability. The formability of the samples was measured using a bend test based on DIN 50111, but with slight modifications to the procedure. In this test a 60 mm×60 mm piece of sheet, with a prior pre-straining of 10% (uniaxial stretching), was placed over two cylindrical rolls, the rolls being separated by a distance equal to twice the sheet thickness. Each roll diameter was 30 mm. Under load, a tapered punch bar of width 100 mm pushes the sheet into the gap between the rolls. The punch force is measured as well as the displacement. At the point of plastic deformation, (i.e. the start of cracking), the load necessary to deform the sheet falls, the punch force reduces and the test is automatically stopped. The sheet thus tested is deformed into a V shape and the internal angle of the V is measured. In this test a lower angle translates into better formability of the sheet. This test, (hereinafter referred to as "the modified DIN 50111 test"), is preferable to other formability tests because the results do not depend so much, if at all, on operator judgment.

Samples 1-3 illustrate the effect of Cu on the performance of the alloys. Samples 2 with 5-7 illustrate the effect of Si on performance. Samples 2 with 8-10 illustrate the effect of Mg on performance.

FIG. 1 shows the stress-displacement curve for sample 2 after joining. The standard travel of the test piece, proportional to elongation is very high, indicating a ductile fracture mode which was also apparent in the fracture surface.

Effect of Cu. FIG. 2 shows the effect of increasing Cu content to a base composition of Al0.5Si on the solidus of the alloys. Adding Cu reduces the solidus temperature and improves wettability. FIG. 3 shows the effect of Cu on hot-cracking susceptibility with hot-cracking more likely as the Cu content increases up to 1.5%. FIG. 4 shows the effect of Cu on joint ductility. FIG. 5 shows the effect of Cu on the joint fracture strength. Increasing Cu from 0.5 to 1.0% increases fracture strength but it falls again slightly if the Cu content is increased towards 1.5%. From FIGS. 3, 4 and 5 we can see that the Cu content should be not be >1.5% and is preferably up to 1.25%.

Effect of Si. FIG. 6 shows the effect of increasing Si content to a base composition of Al1.0Cu on the solidus of the alloys. Adding Si reduces the solidus temperature and improves wettability. FIG. 7 shows the effect of Si on joint ductility. Increasing Si content up to 1.0% improves bond ductility but there is a rapid decline in bond ductility as the Si content increases to 1.5% and beyond. FIG. 8 shows that increasing the Si content leads to an increase in joint fracture strength up to a 1% addition but the fracture strength declines as more Si is added. From FIGS. 7 and 8, we can see that Si should be limited to no more than 1.5% and preferably no more than 1.25% to maintain good joint qualities in terms of ductility and fracture strength.

Effect of Mg. FIG. 9 shows the effect of Mg content on bendability as measured using the modified DIN 50111 test. The effect on elongation is minimal. As the Mg content increases, the bendability of samples prestrained by 10% diminishes towards an Mg content of 0.5 but then improves again as the Mg content is raised further to 2%. FIG. 10 shows the effect of Mg content on visual weld quality after DPI. Additions of Mg from essentially no Mg to 0.5 Mg led to worse weld quality, (coarse porosity and the presence of weld cracks), but the weld quality improved again when 2% Mg was added. The effect of Mg on weld ductility is shown in FIG. 11 and increased Mg content lowers weld ductility. For these reasons the Mg content is limited to the amount of an incidental element or impurity.

FIGS. 12A and 12B show SEM images of the interface seen with AlSi10 alloys (sample 0) joined to steel. In the interface produced with AlSi10 alloys the width of the interface is approximately 10 μm and the region immediately next to the steel alloy comprises an intermetallic zone dominated by $FeAl_3$ (high Al/Fe ratio, in atomic %). The brittle structure is evidenced by the high amount of microcracks in the layer. FIGS. 13A and 13B show SEM images and EDX spectra of the interface produced when sample 2 was joined to steel. The width of the interface is approximately 20 μm and the image reveals a dense and crack-free intermetallic layer. EDX analysis clearly shows that the continuous intermetallic layer at the interface is composed of two phases with various Al/Fe ratios. A third region on the top of the layer, with intermetallics in the shape of needles and a higher Al/Fe ratio is present. The first two intermetallic types are close to the FeAl and $Fe_2Al_5$ stoichiometry, whereas the third type is close to the more brittle $FeAl_3$. There are fundamental differences between the interfaces including the presence of an FeAl-type layer adjacent the steel component when the steel component is joined to the inventive alloy.

EXAMPLE 2

Two composite sheet products were produced where the "core" layer was an AA6016 alloy and a single "clad" layer was applied of either an Al—Si alloy typical of the prior art (Sample 11) or an Al—Cu—Si alloy of the present invention (Sample 12). The clad layers in each sample accounted for 10%, (±1%), of the total sheet thickness. The alloy compositions of each layer are shown in Table 2.

TABLE 2

| Sample | Si | Fe | Cu | Mn | Mg |
| --- | --- | --- | --- | --- | --- |
| Core alloy | 0.61 | 0.18 | 0.15 | 0.05 | 0.67 |
| 11 clad | 9.91 | 0.11 | <0.01 | <0.01 | <0.01 |
| 12 clad | 0.51 | 0.17 | 0.98 | 0.06 | <0.01 |

The ingots were homogenized in an air furnace at 550° C. for 6 hours, hot rolled to 10 mm and cold rolled to 1 mm. The sheet samples were solution heat treated at 540° C. for 40 s, rapidly cooled by air fans and then pre-aged by holding samples at 100° C. for 1 hr.

Some samples were allowed to naturally age to the T4PX condition after being subjected to a 10% pre-strain, a simulation of a typical forming operation. Other samples were further aged to the T8X (paint-baked) condition by subjecting them to a 2% pre-strain followed by ageing at 185° C. for 20 minutes and yet more samples were prepared in the T62 temper by subjecting them to a heat treatment at 205° C. for 30 minutes. The mechanical properties for sample 12 in three different temper conditions are summarized in Table 3.

TABLE 3

| T4PX | | | | T8X | | | T62 | | |
|---|---|---|---|---|---|---|---|---|---|
| Rp0.2 MPa | Rm MPa | A80 % | DC bend angle ° | Rp0.2 MPa | Rm MPa | A80 % | Rp0.2 MPa | Rm MPa | A80 % |
| 112 | 227 | 25.6 | 15 | 218 | 281 | 19.1 | 242 | 289 | 13.5 |

They were then joined to steel sheet under the same laser welding conditions as described in example 1. The joined parts were mechanically tested to evaluate the strength and ductility of the joint.

The stress-strain curve of FIG. 14 shows the results for both samples 11 and 12. In the case of sample 12, the curve is for the product in the T8X condition. There is a dramatic improvement in the strength attained and the ductility for the product according to the invention compared with these qualities for a sample not in accordance with the claims below.

The invention claimed is:

1. A composite aluminum sheet product comprising a core layer and at least one clad layer, wherein the core layer is made from an alloy selected from the group consisting of AA6016, AA6016A, AA6014, AA6011, AA6111, AA6009, AA6010, AA6022 and AA6451, and wherein the at least one clad layer is an aluminum alloy comprising the following composition, all values in weight %:

| | |
|---|---|
| Si | 0.25-1.5 |
| Cu | 0.3-1.5 |
| Fe | up to 0.5 |
| Mn | up to 0.1 | all other elements including Mg being incidental and present then in an amount more than or equal to 0 and less than or equal to 0.05 individually, and more than or equal to 0 and less than or equal to 0.15 in aggregate, the balance being aluminum.

2. The composite aluminum sheet product of claim 1, wherein the aluminum alloy of the at least one clad layer comprises a lower limit of Si of 0.5 weight %.

3. The composite aluminum sheet product of claim 1, wherein the aluminum alloy of the at least one clad layer comprises an upper limit of Si of 1.25 weight %.

4. The composite aluminum sheet product of claim 1, wherein the aluminum alloy of the at least one clad layer comprises an upper limit of Cu of 1.25 weight %.

5. The composite aluminum sheet product of claim 1, wherein the aluminum alloy of the at least one clad layer comprises an upper limit of Mn of 0.08 weight %.

6. The composite aluminum sheet product of claim 1, wherein the aluminum alloy of the at least one clad layer comprises an upper limit of Mn of 0.05 weight %.

7. A joined structure wherein the joined structure comprises a steel component and an aluminum alloy component joined thereto and wherein the aluminum alloy component is made from a composite aluminum sheet product according to claim 1.

8. A joined structure according to claim 7 wherein the interface zone between the steel component and the aluminum alloy component is characterized by an FeAl layer adjacent the steel component.

9. The joined structure of claim 7, wherein the steel component is coated with zinc.

10. A method of making a joined structure wherein the joined structure comprises a steel component and an aluminum alloy component and wherein the steel and aluminum alloy components are joined by a thermal process that causes at least a part of the aluminum alloy component to melt and wherein the aluminum alloy component is made from a composite aluminum sheet product according to claim 1.

11. A method as claimed in claim 10 wherein the thermal process is laser welding.

12. A method of making a joined structure wherein the joined structure comprises a steel component and an aluminum alloy component and wherein the steel and aluminum alloy components are joined by a fluxless joining procedure comprising a thermal process, that causes at least a part of the aluminum alloy component to melt and wherein the aluminum alloy component is made from a composite aluminum sheet product according to claim 1.

13. A method as claimed in claim 12, wherein the thermal process is fluxless brazing, braze welding or fluxless laser welding.

* * * * *